United States Patent
Savage

(10) Patent No.: US 8,990,151 B2
(45) Date of Patent: Mar. 24, 2015

(54) AUTOMATIC AND SEMI-AUTOMATIC TAGGING FEATURES OF WORK ITEMS IN A SHARED WORKSPACE FOR METADATA TRACKING IN A CLOUD-BASED CONTENT MANAGEMENT SYSTEM WITH SELECTIVE OR OPTIONAL USER CONTRIBUTION

(71) Applicant: Box, Inc., Los Altos, CA (US)

(72) Inventor: Brandon Savage, San Carlos, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/968,357

(22) Filed: Aug. 15, 2013

(65) Prior Publication Data
US 2013/0332409 A1    Dec. 12, 2013

Related U.S. Application Data

(62) Division of application No. 13/274,268, filed on Oct. 14, 2011, now Pat. No. 8,515,902.

(51) Int. Cl.
*G06F 7/06*      (2006.01)
*G06F 17/30*     (2006.01)

(52) U.S. Cl.
CPC .... *G06F 17/30011* (2013.01); *G06F 17/30598* (2013.01); *G06F 17/30017* (2013.01); *G06F 17/30312* (2013.01); *G06F 17/30014* (2013.01); *G06F 17/3089* (2013.01); *G06F 17/301* (2013.01)
USPC .............. 707/608; 707/607; 707/805

(58) Field of Classification Search
CPC ............. G06F 17/30598; G06F 17/30011; G06F 17/30017; G06F 17/30312
See application file for complete search history.

(56) References Cited

U.S. PATENT DOCUMENTS

| | | |
|---|---|---|
| 5,799,320 A | 8/1998 | Klug |
| 5,848,415 A | 12/1998 | Guck |
| 5,999,908 A | 12/1999 | Abelow |
| 6,034,621 A | 3/2000 | Kaufman |
| 6,073,161 A | 6/2000 | DeBoskey et al. |
| 6,098,078 A | 8/2000 | Gehani et al. |
| 6,233,600 B1 | 5/2001 | Salas et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

"PaperPort Professional 14," PC Mag. Com review, published Feb. 2012, Ziff Davis, Inc., 8 pages.

(Continued)

*Primary Examiner* — Bruce Moser
(74) *Attorney, Agent, or Firm* — Perkins Coie LLP

(57) ABSTRACT

Systems and methods for supporting metadata for work items stored in a web-based content management system with collaboration environment are disclosed. Users uploading work items to a folder are not required to provide metadata for the work items. Collaborators of the folder can provide metadata to work items within the folder.

20 Claims, 12 Drawing Sheets

(56) References Cited

U.S. PATENT DOCUMENTS

| | | |
|---|---|---|
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,429,540 B1 | 4/2013 | Yankovich et al. |
| 8,464,161 B2 | 6/2013 | Giles et al. |
| 8,549,066 B1 | 10/2013 | Donahue et al. |
| 8,549,511 B2 | 10/2013 | Seki et al. |
| 8,607,306 B1 | 12/2013 | Bridge et al. |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0256065 A1 | 11/2007 | Heishi et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005195 A1 | 1/2008 | Li |
| 2008/0016146 A1 | 1/2008 | Gan et al. |
| 2008/0021959 A1 | 1/2008 | Naghi et al. |

(56) References Cited

U.S. PATENT DOCUMENTS

| | | |
|---|---|---|
| 2008/0028323 A1 | 1/2008 | Rosen et al. |
| 2008/0040173 A1 | 2/2008 | Aleong et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0194239 A1 | 8/2008 | Hagan |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0322252 A1 | 12/2010 | Suganthi et al. |
| 2010/0325155 A1 | 12/2010 | Skinner et al. |
| 2010/0325655 A1 | 12/2010 | Perez |
| 2010/0332401 A1 | 12/2010 | Prahlad et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252320 A1 | 10/2011 | Arrasvuori et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |

(56) References Cited

U.S. PATENT DOCUMENTS

| | | | |
|---|---|---|---|
| 2012/0089659 A1 | 4/2012 | Halevi et al. |
| 2012/0110436 A1 | 5/2012 | Adler, III et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1* | 7/2012 | Berger | 709/204 |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0156373 A1 | 6/2014 | Roberts et al. |
| 2014/0172595 A1 | 6/2014 | Beddow et al. |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

"PaperPort," Wikipedia article (old revision), published May 19, 2012, Wikipedia Foundation, 2 pages.

"Quickoffice Enhances Android Mobile office Application for Improved Productivity on latest Smartphone and Table Devices," QuickOffice Press Release, Nov. 21, 2011, QuickOffice Inc., 2 pages.

"QuickOffice," Wikipedia Article (old revision), published May 9, 2012, Wikipedia Foundation, 2 pages.

Exam Report for EP13168784.0, Applicant: Box, Inc. Mailed Nov. 21, 2013, 7 pages.

Exam Report for GB1309209.3, Applicant: Box, Inc. Mailed Oct. 30, 2013, 11 pages.

Exam Report for GB1311417.8, Applicant: Box, Inc. Mailed Dec. 23, 2013, 5 pages.

Exam Report for GB1312095.1, Applicant: Box, Inc. Mailed Dec. 12, 2013, 7 pages.

Exam Report for GB1312874.9, Applicant: Box, Inc. Mailed Dec. 20, 2013, 11 pages.

Exam Report for GB1316532.9, Applicant: Box, Inc. Mailed Oct. 31, 2013, 10 pages.

International Search Report and Written Opinion for PCT/US2013/034765, Applicant: Box, Inc., Mailed Jan. 20, 2014, 15 pages.

Exam Report for EP13185269.1, Applicant: Box, Inc. Mailed Jan. 28, 7 pages.

Exam Report for GB1314771.5, Applicant: Box, Inc. Mailed Feb. 17, 2014, 7 pages.

Exam Report for GB1316533.7, Applicant: Box, Inc. Mailed Oct. 8, 2013, 9 pages.

Exam Report for GB1316971.9, Applicant: Box, Inc. Mailed Nov. 26, 2013, 10 pages.

(56) References Cited

OTHER PUBLICATIONS

Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 6 pages.
Gedymin, "Cloud computing with an emphasis on Google App Engine," Master Final Project, Sep. 2011, 146 pages.
Patent Court Document of Approved Judgment for GB0602349.3 and GB0623571.7; Mar. 3, 2009, 17 pages.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. Mailed Mar. 10, 2014, 4 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
Exam Report for GB1313559.5, Applicant: Box, Inc., Mailed Aug. 22, 2013, 19 pages.
International Search Report and Written Opinion for PCT/US2008/012973 dated Apr. 30, 2009, pp. 1-11.
International Search Report and Written Opinion for PCT/US2010/070366, Applicant: Box, Inc., Mailed Apr. 24, 2013, 10 pages.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
International Search Report and Written Opinion for PCT/US2013/039782, Applicant: Box, Inc., Mailed Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 28, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Exam Report for GB1310666.1, Applicant: Box, Inc. Mailed Aug. 30, 2013, 10 pages.
Google Docs, http://web.Archive.org/web/20100413105758/http://en.wikipedia.org/wiki/Google_docs, Apr. 13, 2010, 6 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web.Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1312264.3, Applicant: Box, Inc. Mailed Mar. 24, 2014, 7 pages.
Exam Report for GB1318792.7, Applicant: Box, Inc. Mailed May 22, 2014, 2 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.

(56) References Cited

OTHER PUBLICATIONS

Search Report for EP14153783.7, Applicant: Box, Inc. Mailed Mar. 24, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12 pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.

\* cited by examiner

FIG. 4

Create New Folder

| Folder Information | Attribute Setup |

Select up to 5 attributes to be required for all content added to this folder. You can also set default values for these attributes.

| Attribute Name | Default Value | Editable |
|---|---|---|
| Buyer | Marketing call center | ☑ |
| Buyer information attri...<br>Buyer information set | Enter default or leave blank ▶ | ☐ |
| Caller name<br>Buyer information set | Set default value ▶ | ☑ |

✚ Add attribute

( Save )  ( Cancel )

PIN  Updates | Files | Contacts  Apps  My Account ▼

All Files > Marketing Active Work
☐ Marketing Active Work

Files and Folders | 0 Discussions

≣ List ▼  ◢ Add attributes  ⇧ Upload  ✚ New... ▼  □ tags ▼  🔍 Search Files
Sort by: Date ▼  http://www.pin.net/shared/g1o24mtz0u  Folder Options ▼

%Folder_Owner% requires attributes for 3 files. ◂ Add attributes

Select files to add attributes:  ☐
☑ 1. Marketing Reports.doc
☐ 2. Semi-annual product report.doc
☐ 3. Get involved with Pin Product.ppt Call date: e.g. 01/28/2011 🗓
Last call time: ☐ PM ▼
Client name: ☐
Phone number: ☐
Departments: 3 selected ▼

Apply  Do this Later

▸ Add optional attributes

24 Collaborators ▴
▪ jen@pin.net
▪ You
▪ Aaron Levie
▪ ashley@pin.net
▪ Ravi@pin.net
▪ 16 more collaborators ▸

Enter email addresses here
Invite Collaborators openpin-register.gif
Created Mar 14 2011 · 32.0KB openpin-register2.gif
Created Mar 14 2011 · 26.3KB Uploading 27.5 MB of 76 MB   ✕

600

*PIN* Updates | Files | Contacts  Apps  My Account ▼  🔍 Search Files

All Files > ... > Marketing > Marketing Active Work
📁 Marketing Active Work

Files and Folders | Discussions    📋 List ▼   ⬆ Upload   ✚ New... ▼   🏷 Tags ▼   Folder Options ▼

🔗 http://www.pin.net/shared/g1o24mtz0u

Sort by: Date ▼

Customer Success
Updated Mar 11, 2011 by Phil   📄 24  👤 13   Share 🔗 📎 ▶ ☐

EmailMarketing.psd
Created Jan 10, 2011 by Steven Smith • 1.2MB   Share 🔗 📎 ▶ ☐

Marketing Team Agenda.webdoc
Updated Dec 6, 2010 by Hellen Sullivan • 1.2MB   Share 🔗 📎 ▶ ☐

Marketing and Cloud Content Management.pdf
Created Nov 29, 2010 by Julia White • 1.2MB   Share 🔗 📎 ▶ ☐
Tags: [Marketing] [Content Management] [Cloud] [Resources] + Tag
Attributes: [Client name: Steven Williams] [Call date: 2/12/2011] [Groups: (Add)] [Contact Time: 11:34 PM]

Marketing Launch Calendar.xls
Updated Nov 24, 2011 by David Miles • 1.2MB   Share 🔗 📎 ▶ ☐

---

24 Collaborators ▲
▪ jen@pin.net
▪ You
▪ Aaron Levie
▪ ashley@pin.net
▪ Ravi@pin.net
▪ 16 more collaborators ▶

Enter email addresses here
Invite Collaborators

AUTOMATIC AND SEMI-AUTOMATIC TAGGING FEATURES OF WORK ITEMS IN A SHARED WORKSPACE FOR METADATA TRACKING IN A CLOUD-BASED CONTENT MANAGEMENT SYSTEM WITH SELECTIVE OR OPTIONAL USER CONTRIBUTION

CROSS REFERENCE TO RELATED APPLICATIONS

This application is a divisional application of U.S. patent application Ser. No. 13/274,268 entitled "Automatic and Semi-Automatic Tagging Features of Work Items in a Shared Workspace for Metadata Tracking in a Cloud-Based Content Management System with Selective or Optional User Contribution," which was filed on Oct. 14, 2011 and is related to U.S. patent application Ser. No. 13/165,725 entitled "Batch Uploading of Content to a Web-Based Collaboration Environment", each of which is incorporated by reference herein in its entirety.

BACKGROUND

Accurate, descriptive metadata about the contents and context of data files stored in a data repository is needed to ensure that a search for information in the repository is quick and effective.

BRIEF DESCRIPTION OF THE DRAWINGS

Examples of a web-based content management system with a collaboration environment that supports metadata are illustrated in the figures. The examples and figures are illustrative rather than limiting.

FIG. 4 depicts a screenshot of an example user interface that shows attributes managed and maintained for an account by the account administrator.

FIG. 5 depicts a screenshot of an example user interface that shows attribute setup during creation of a new folder.

FIG. 6 depicts a screenshot of an example user interface for entering missing attributes for a work item.

FIG. 7 depicts a screenshot of an example user interface that shows tags and attributes of a work item.

DETAILED DESCRIPTION

A system is described for supporting metadata for work items stored in a workspace in a web-based content management system with a collaboration environment. The creator of the workspace specifies metadata attributes for all work items stored in the workspace. However, a user uploading a work item to the workspace is not required to provide metadata for the specified attributes before being permitted to upload the work item to the workspace. Collaborators of the workspace can provide metadata for any work item stored within the folder.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
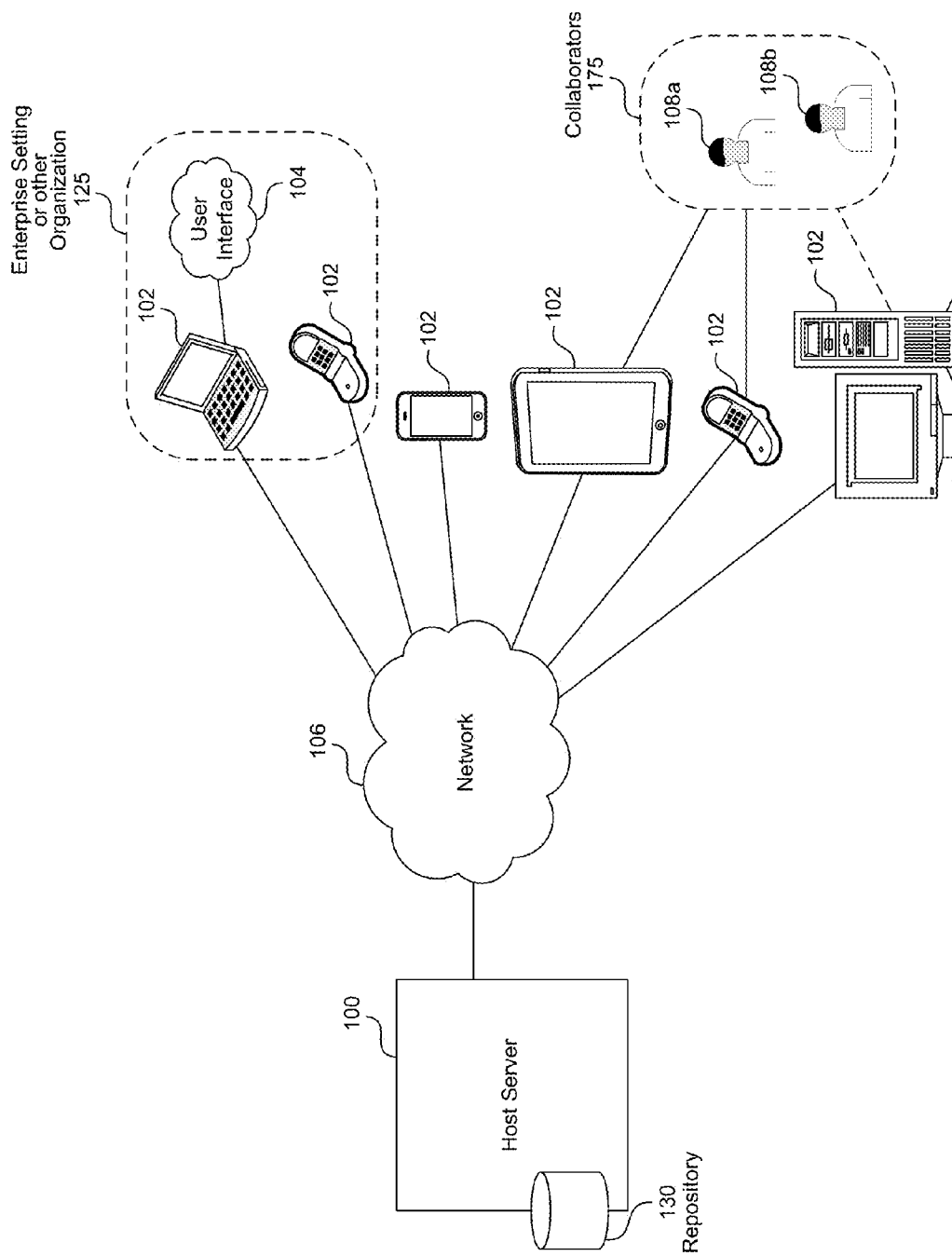
FIG. 1 illustrates an example diagram of a system where a host server supports file metadata in an online collaboration environment.

FIG. 1 illustrates an example diagram of a system where a host server 100 supports collaborative metadata for work items in a content management system with an online collaboration environment for users 108 of the work items. The content management system can generally be a cloud-based service.

The client devices 102 can be any system and/or device, and/or any combination of devices/systems that is able to establish a connection, including wired, wireless, cellular connections with another device, a server and/or other systems such as host server 100. Client devices 102 will typically include a display and/or other output functionalities to present information and data exchanged between or among the devices 102 and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the client devices 102 and host server 100 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based content management system with a collaboration environment or online collaboration platform (e.g., hosted by the host server 100).

The collaboration platform or environment hosts workspaces with work items stored in the data repository 130 that one or more users can access (e.g., view, edit, update, revise, comment, add to discussions, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc.

The data repository 130 is a database that can be managed by a database management system (DBMS), for example but not limited to, Oracle, DB2, Microsoft Access, Microsoft SQL Server, PostgreSQL, MySQL, FileMaker, etc. The data repository 130 can be implemented via object-oriented technology and/or via text files, and can be managed by a distributed database management system, an object-oriented database management system (OODBMS) (e.g., ConceptBase, FastDB Main Memory Database Management System, JDO-Instruments, ObjectDB, etc.), an object-relational database management system (ORDBMS) (e.g., Informix, OpenLink Virtuoso, VMDS, etc.), a file system, and/or any other convenient or known database management package.

A workspace can generally refer to any grouping of a set of digital content in the collaboration platform. In general, the content management system permits a user to group stored files in a hierarchical manner, such that a workspace made up of a group of files can be contained within another workspace, such as a folder. The grouping can be created, identified, or specified by a user or through other means. This user may be a creator user or administrative user, for example. The workspace can also include an online discussion area for collaborators to engage in an online discussion.

In general, a workspace can be associated with a set of users or collaborators (e.g., collaborators 108) who have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a work space and/or a user who created/uploaded a particular piece of content to the workspace, or any other designated user or collaborator. In one embodiment, access rights can include permission to view and/or edit metadata or attributes associated with a work item.

In general, the collaboration platform allows multiple users or collaborators to access or collaborate efforts on work items such that each user can see, remotely, edits, revisions, comments, or annotations being made to specific work items through their own user devices. For example, a user can upload a document to a work space for other users to access (e.g., for viewing, editing, commenting, discussing, signing-off, or otherwise manipulating). The user can log in to the online platform and upload the document (or any other type of work item) to an existing work space or to a new work space. The document can be shared with existing users or collaborators in a work space.

Figure 2:
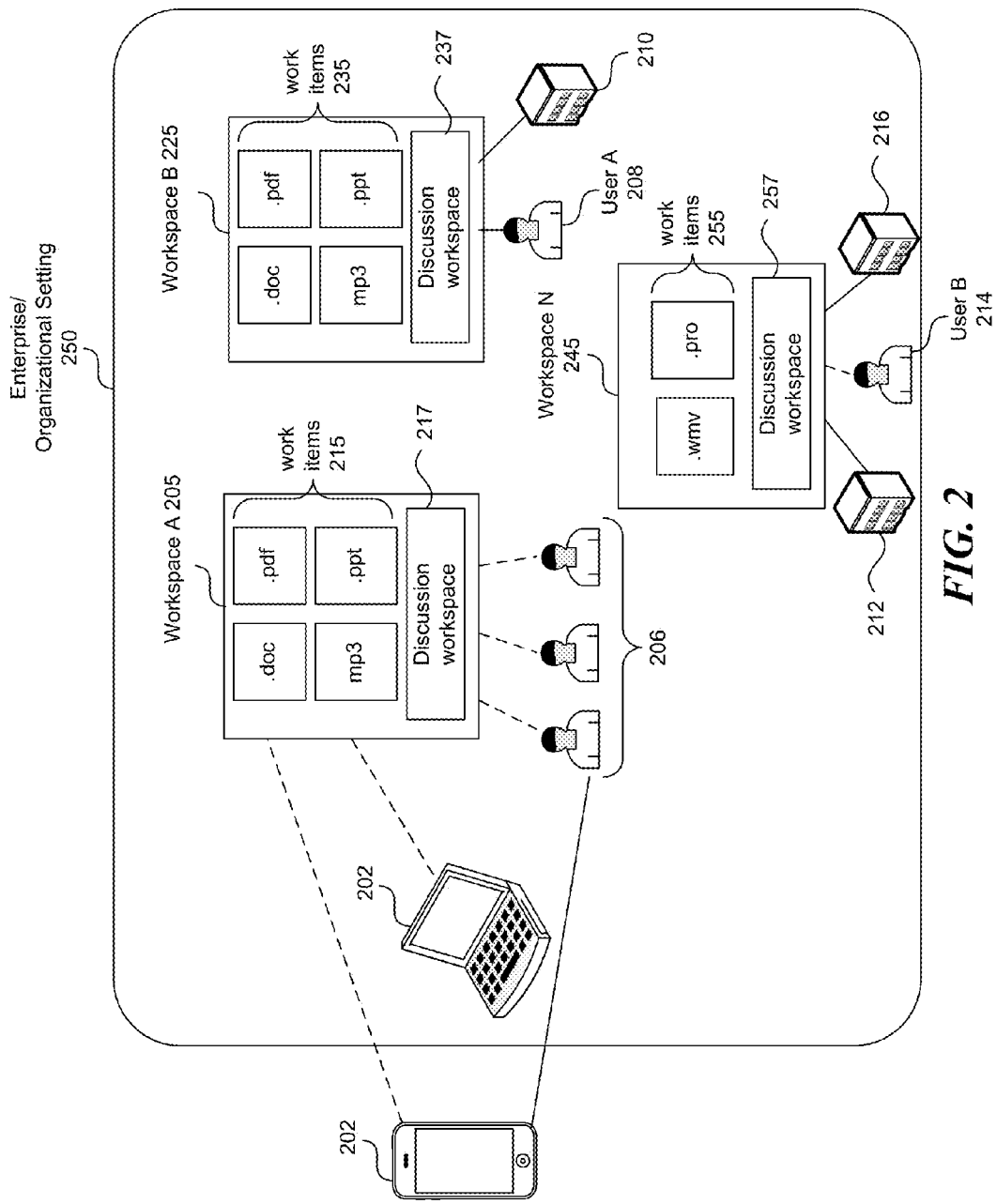
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2.

In one embodiment, discussions among collaborators of a workspace or folder can be linked to the particular workspace or folder, and collaborators can create topics for discussion and comment on those topics.

Functions and techniques disclosed for implementing collaborative metadata in the web-based content management system can be performed by the host server 100. Functions and techniques performed by the host server 100 and the related components therein are described below, respectively, in detail with further reference to the example of FIG. 3.

In one embodiment, client devices 102 communicate with the host server 100 over network 106. In general, network 106, over which the client devices 102 and the host server 100 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing workspaces 205, 225, 245 which include work items 215, 235, 255 and for providing a discussion workspace area 217, 237, 257 linked to the respective workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, work space A 205 and discussion workspace 217 can be associated with work items 215, work space B 225 and discussion workspace 237 can be associated with work items 235, and work space N 245 and discussion workspace 257 can be associated with work items 255. The work items 215, 235, and 255 may be unique to each work space but need not be. For example, a particular document can be associated with only one work space (e.g., work space A 205) or it may be associated with multiple work spaces (e.g., work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208, and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In one embodiment, a first type of permission level, e.g. an editor, can allow a user to have full read and write access to a workspace such that the user can view and download contents of the workspace as well as upload new content to the workspace. A second type of permission level, e.g. a viewer, can allow a user to have full read access to a workspace such that the user can view and download contents of the workspace but not upload or edit contents of the workspace. A third type of permission level, e.g. an uploader, can allow a user to have limited write access to contents of a workspace such that the user can see items in the workspace but not download or view the items, while being permitted to upload new content to the workspace.

In one embodiment, the ability of a user associated with a workspace to contribute to a discussion workspace linked to that workspace or to invite others to join the workspace can be tied to the permission level of the user. For instance, an editor may be permitted to participate in the discussion workspace and invite other collaborators, while a viewer may only be allowed to participate in the discussion workspace, and an uploader may not be permitted to perform either action. Alternatively, separate discussion permission and/or invitation permission can be assigned by a creator or administrator of a workspace to individuals associated with the workspace. In some instances, discussion permission and/or invitation permission can be associated with the workspace or the items in the workspace or can be based upon any other criteria.

Figure 3:
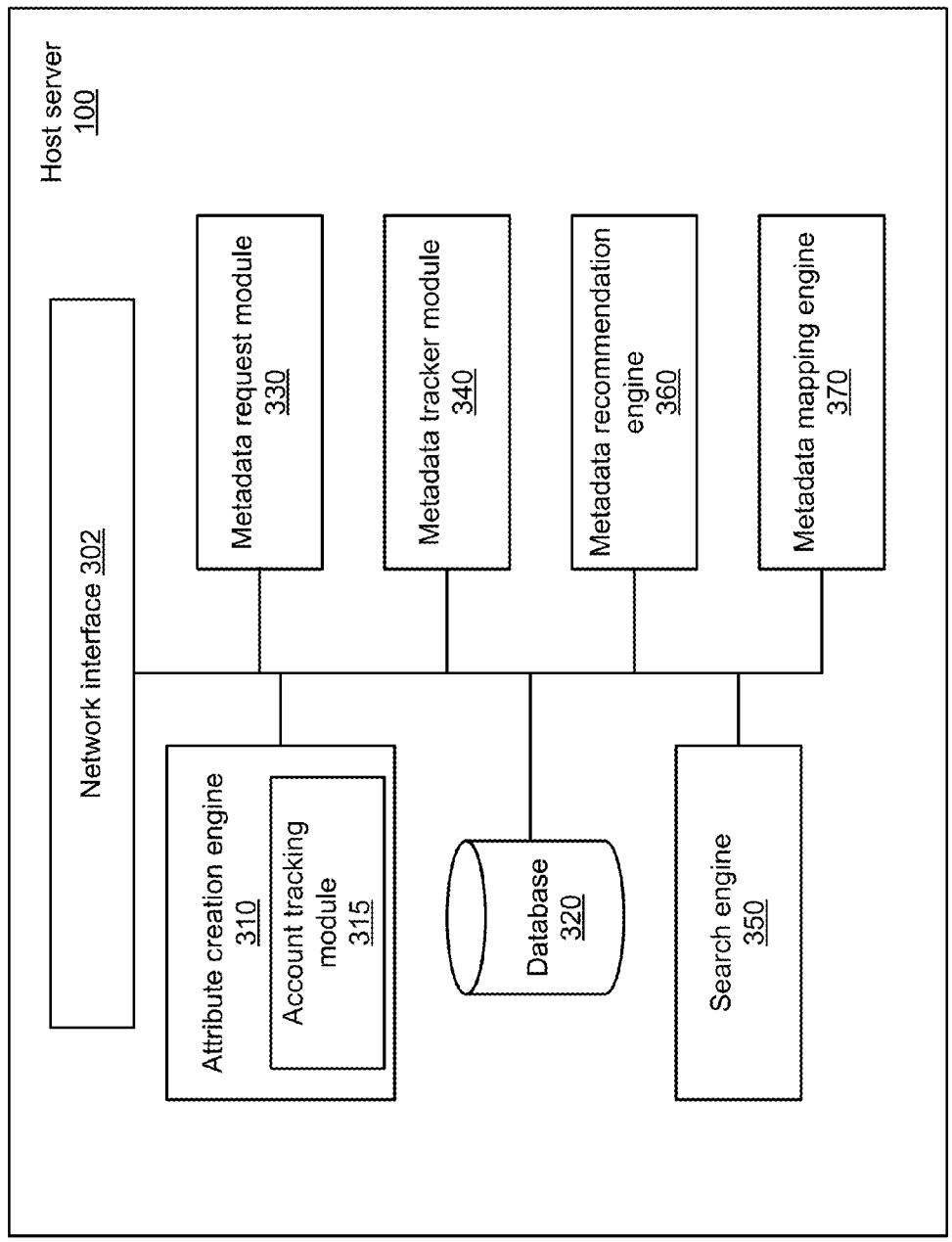
FIG. 3 depicts a block diagram illustrating an example of components in the host server of a web-based collaboration environment that supports file metadata.

FIG. 3 shows a block diagram of an example host server 100 of a web-based collaboration environment that supports collaborative metadata for work items in the collaboration environment. Collaborative metadata refers to when one or more collaborators of a workspace or folder are given the ability to review metadata assigned to a work item in the folder and to add or edit metadata associated with the work item. In some embodiments, all collaborators are permitted to review and/or edit metadata associated with a work item, while in other embodiments, collaborators must be given metadata access rights before being permitted to do so. Because collaborators can add and/or edit metadata of a work item, a user is not required to provide any metadata before uploading the work item to the online content management system.

The host server 100 of the web-based or online content management system with a collaboration environment can include, for example, a network interface 302, an attribute creation engine 310, an attribute database 320, a metadata request module 330, a metadata tracker module 340, a search engine 350, a metadata recommendation engine 360, and a metadata mapping engine 370. The attribute creation engine 310 can include an account tracking module 315.

The network interface 302 can be a networking module that enables the host server 100 to mediate data in a network with an entity that is external to the host server 100, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. 101), and to specifically exclude all media that are non-statutory in nature to the extent that the exclusion is necessary for a claim that includes the computer-readable (storage) medium to be valid. Known statutory computer-readable media include hardware (e.g., registers, random access memory (RAM), non-volatile (NV) storage, to name a few), but may or may not be limited to hardware.

Figure 4:
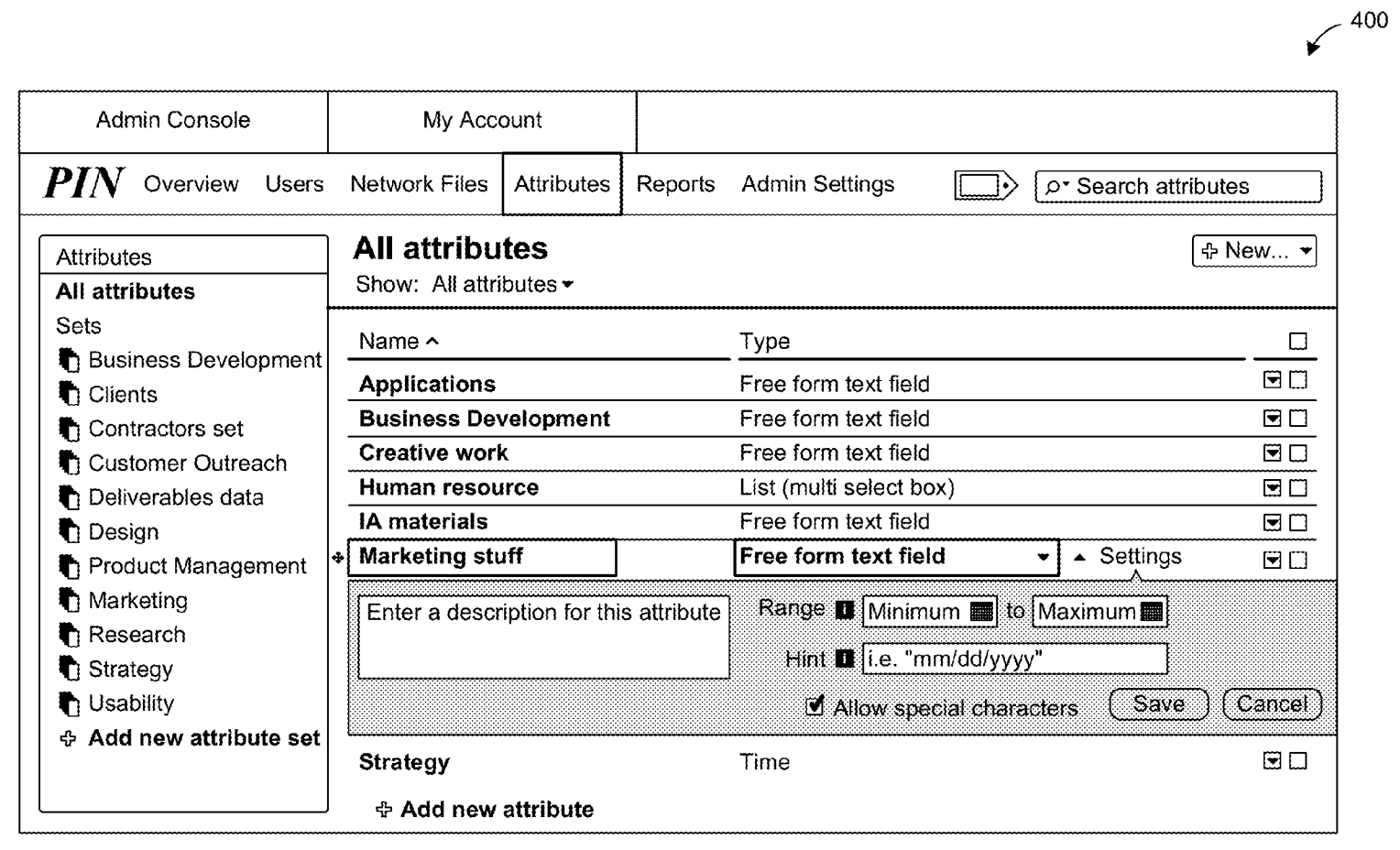

One embodiment of the host server 100 includes an attribute creation engine 310 that allows an administrator of a workspace or a user authorized by the administrator to create and manage a list of metadata attributes that is accessible enterprise-wide to the administrator's managed user accounts. By restricting the creation and maintenance of enterprise-wide metadata to the administrator, metadata terms can be made consistent across the account. In one embodiment, during the process of creating an attribute, the attribute creation engine 310 prompts the administrator to provide an attribute name and to select a type for the attribute. The attribute type gives a user an indication of the format to include when providing metadata information for a particular work item or file. A type can include, for example, a free form text field, a pick list, date, or time. Additional information such as the settings for an attribute can also be requested. For example, if the type were a date field, the settings can include a minimum and a maximum date range. The additional information can also include a description for the attribute to help the end user understand what is being requested. An example user interface for creating an attribute is shown in FIG. 4.

In one embodiment, attributes can be arranged into sets by the administrator through the attribute creation engine 310. An attribute set is a grouping of attributes that can be easily applied to a work item to ensure that the attributes requested for work items or files across an account is consistent. For example, an attribute set for legal contracts can be created with the name 'legal contract attribute set'. In one instance, the legal contract set can include attributes such as drafting attorney name, contract start date, and parties to the contract. Then the legal contract attribute set can be applied to a workspace or folder intended to organize legal contracts so that any work items placed in the folder will automatically request metadata for the attributes in the legal contract attribute set from the person who uploads the file to the folder or from a collaborator of the folder who accesses the folder after the work item has been uploaded.

Once the attributes and/or attribute sets have been created, they are stored in the database 320. Only the administrator or a user authorized by the administrator is permitted to create, modify, or delete enterprise-wide attributes. The database 320 also stores the metadata for each work item stored in the web-based content management system that corresponds to the attributes and/or attribute sets corresponding to the work item. In one embodiment, the database 320 can be made up of several separate databases. In one embodiment, the database 320 can be external to the host server 100.

The attribute creation engine 310 can include an account tracking module 315 that applies certain attributes and/or attribute sets created by an administrator only to the administrator's accounts. Each administrator can set up his own list of attributes and attribute sets to be used within the administrator's own account(s) that are separate from one or more accounts that the administrator manages for a group of users. In one embodiment, the account tracking module 315 can also maintain a list of the users authorized by the administrator of an account to create and manage the attribute and attribute sets for the managed account(s).

Because the creator of a folder knows the kind of information that will likely be in the work items stored in the folder, in one embodiment, the metadata request module 330 prompts the creator of each folder for attributes and/or attribute sets to be requested for all work items that are stored in that folder. The metadata request module 330 also requests default values for the attributes and/or attribute sets that the creator selects. FIG. 5 shows an example user interface used by the metadata request module 330 to request attributes for a new folder. Child folders that are created in a parent folder that has already been assigned attributes and/or attribute sets inherit the same attributes and/or attribute sets upon creation. Similarly, the default values for the attributes are also inherited from the parent folder. However, the owner or creator of the child folder can modify the attributes and/or attributes sets associated with the child folder.

In one embodiment, the metadata request module 330 prompts a user who uploads a file to a particular folder to provide corresponding metadata for the attributes and/or attribute sets that have been assigned to that folder by the creator of the folder. The user can provide all, some, or none of the requested metadata information. Additionally or alternatively, the user can provide metadata for any attribute, even if it hasn't been designated by the folder creator as long as that attribute has been created by the administrator so that it exists in the attribute database 320. In one embodiment, the user can provide incomplete metadata information or no metadata information at all for a file. If incomplete or no metadata information is provided by the user uploading the file, the user is still permitted to upload the file. Then the metadata tracker module 340 will prompt any collaborator of the folder who subsequently accesses the folder to provide the missing metadata information for that file and any other files in the folder that have missing metadata information. In one embodiment, only authorized collaborators are requested to provide missing metadata. FIG. 6 shows an example user interface used by the metadata tracker module 340 to request metadata.

The search engine 350 can be used by a user of the online collaboration environment to search for and sort work items that have been tagged with a particular attribute term. Additionally or alternatively, work items can be searched for and sorted by two or more terms that are related, for example, all work items that are tagged with customer code=0010 AND sales rep=Jim. An example user interface for searching using metadata is shown in FIG. 7. A user can enter, edit, and/or add metadata search terms, and the search engine 350 can search for work items within the account that have been appropriately tagged.

One embodiment of the host server 100 includes a metadata recommendation engine 360 that can recommend metadata to a user uploading a file to the online content management system. In one embodiment, the metadata recommendation engine 360 can base the recommendations on other metadata terms in the folder to which the document is uploaded. Alternatively, or additionally, the metadata recommendation engine 360 can base the recommendations on previous metadata terms that have been entered by the uploading user. In one embodiment, the metadata recommendation engine 360 can analyze the document for the use of substantive words or phrases having a minimum density, index and rank the content of the document based upon semantic analysis, or use any other metadata determination algorithm to determine the metadata terms to recommend to the user.

The host server 100 performs cloud-based enterprise content management services (ECM). In one embodiment, the host server 100 can connect with other client on-premise ECMs with traditional content platforms, for example, SharePoint or Documentum, to synchronize or transfer data to and from the host server 100 or when migrating content between the on-premise ECM and the host server 100. One embodiment of the host server 100 includes a metadata mapping engine 370 that maps metadata fields between files stored on the host server 100 and the on-premise ECM. Thus, data synchronized between the host server 100 and a client's other ECM, for example, SharePoint, can contain the same or similar metadata.

Figure 8:
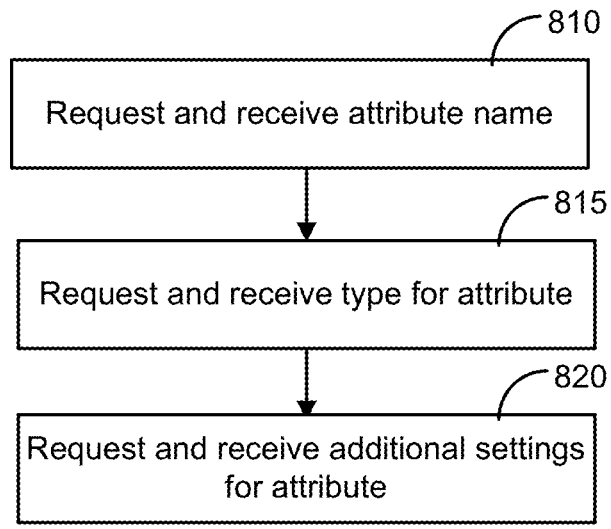
FIG. 8 depicts a flow diagram illustrating an example process of creating metadata attributes by an administrator.

FIG. 8 depicts a flow diagram illustrating an example process of creating metadata attributes by an administrator. FIG. 4 shows an example user interface that shows some created attribute sets, attributes, attribute types, and attribute settings.

At block 810, the system requests and receives a name for the metadata attribute from the administrator of one or more accounts on the web-based content management system. Then at block 815, the system requests and receives a type for the attribute. Examples of metadata attribute types include, but are not limited to, free form text field, time, date, and list with a box that allows for multiple selections.

At block 820, the system requests and receives additional settings for the metadata attribute. For example, if the type of attribute were a date field, the settings could indicate a minimum and a maximum data range. The settings can also include a description to explain to the end user the type of metadata information that is being requested by the system.

Figure 9:
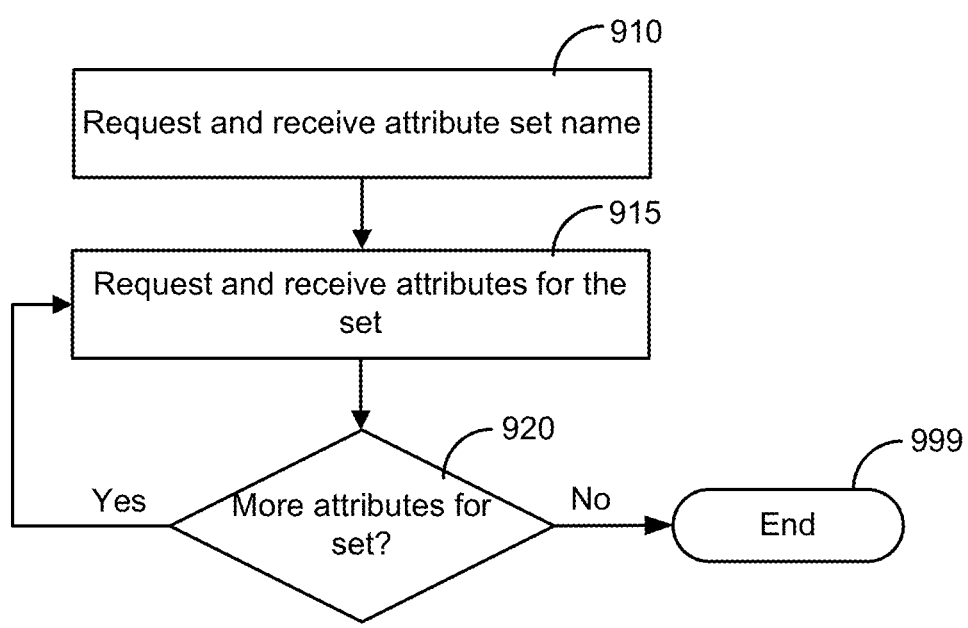
FIG. 9 depicts a flow diagram illustrating an example process of creating metadata attribute sets by an administrator.

FIG. 9 depicts a flow diagram illustrating an example process of creating metadata attribute sets by an administrator. At block 910, the system requests and receives a name for the metadata attribute set from the administrator of one or more accounts on the content management system. Then at block 915, the system requests and receives the metadata attributes for the set from the administrator.

At decision block 920, the system determines if there are more metadata attributes to be included in the set. If the administrator indicates that there are more attributes (block 920—Yes) the process returns to block 915. If the administrator indicates that there are no more attributes to be included (block 920—No), the process ends at block 999.

Figure 10:
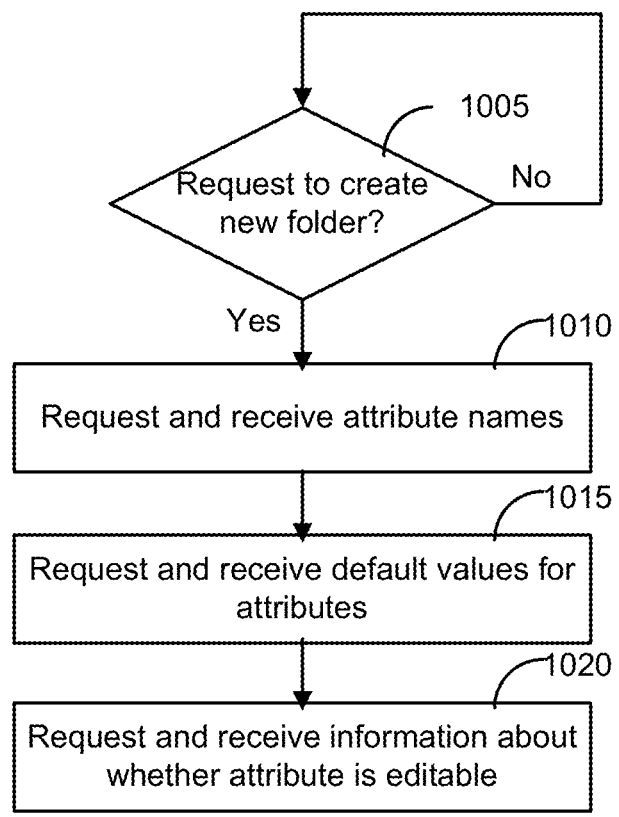
FIG. 10 depicts a flow diagram illustrating an example process of creating a new folder.

FIG. 10 depicts a flow diagram illustrating an example process of creating a new folder in the web-based content management system.

At decision block 1005, the system determines if there is a request to create a new folder. If there is no request (block 1005—No), the process remains at decision block 1005 until there is a request. If there is a request (block 1005—Yes), at block 1010, the system requests and receives from the creator of the folder metadata attribute names to be requested for work items uploaded to the folder.

Then at block 1015, the system requests and receives default values, if any, for the attributes from the folder creator. For example, one metadata attribute that can be assigned to a legal folder is 'client name', and a default value for 'client name' can be Company ABC if all of the work items in the legal folder pertain to Company ABC.

At block 1020, the system requests and receives from the folder creator information about whether the given default metadata are editable. If the folder creator indicates that the default metadata for an attribute is not editable, neither collaborators of the folder nor the user who uploads a work item to the folder is permitted to change the metadata for the attribute for the work item from the default value.

FIG. 5 shows an example user interface for establishing metadata attribute information for a new folder in the online content management system.

Figure 11:
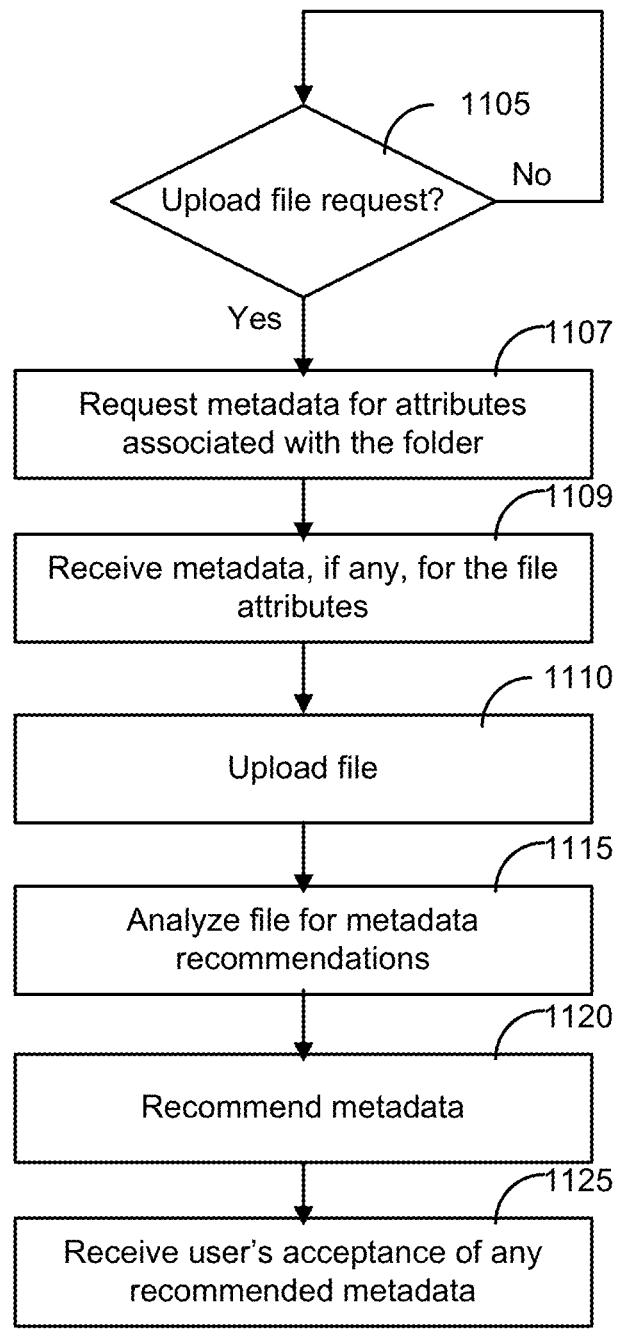
FIG. 11 depicts a flow diagram illustrating an example process of uploading a file.

FIG. 11 depicts a flow diagram illustrating an example process of uploading a file to the online content management system. At decision block 1105, the system determines if a file upload request has been received from a user. An upload request can be made by using a user interface to the online content management system, using email, or through an application programming interface (API), for example. If no file upload request has been received (block 1105—No), the process remains at decision block 1105 until there is a request. If a file upload request has been received (block 1105—Yes), at block 1107, the system requests metadata from the user for the attributes associated with the folder that were selected by the folder creator.

Then at block 1109, the system receives metadata, if any, from the user for the selected file attributes. The user is not required to provide metadata for the file before uploading a file to the online content management system. At block 1110, the system uploads the file, even if the user has not provided any metadata for the required file attributes.

Then at block 1115, the system analyzes the file to determine metadata recommendations. At block 1120, the system recommends the determined metadata for the file to the user. At block 1125, the system receives the user's acceptance of any of the recommended metadata selections. The user does not have to accept any of the recommended metadata.

Figure 12:
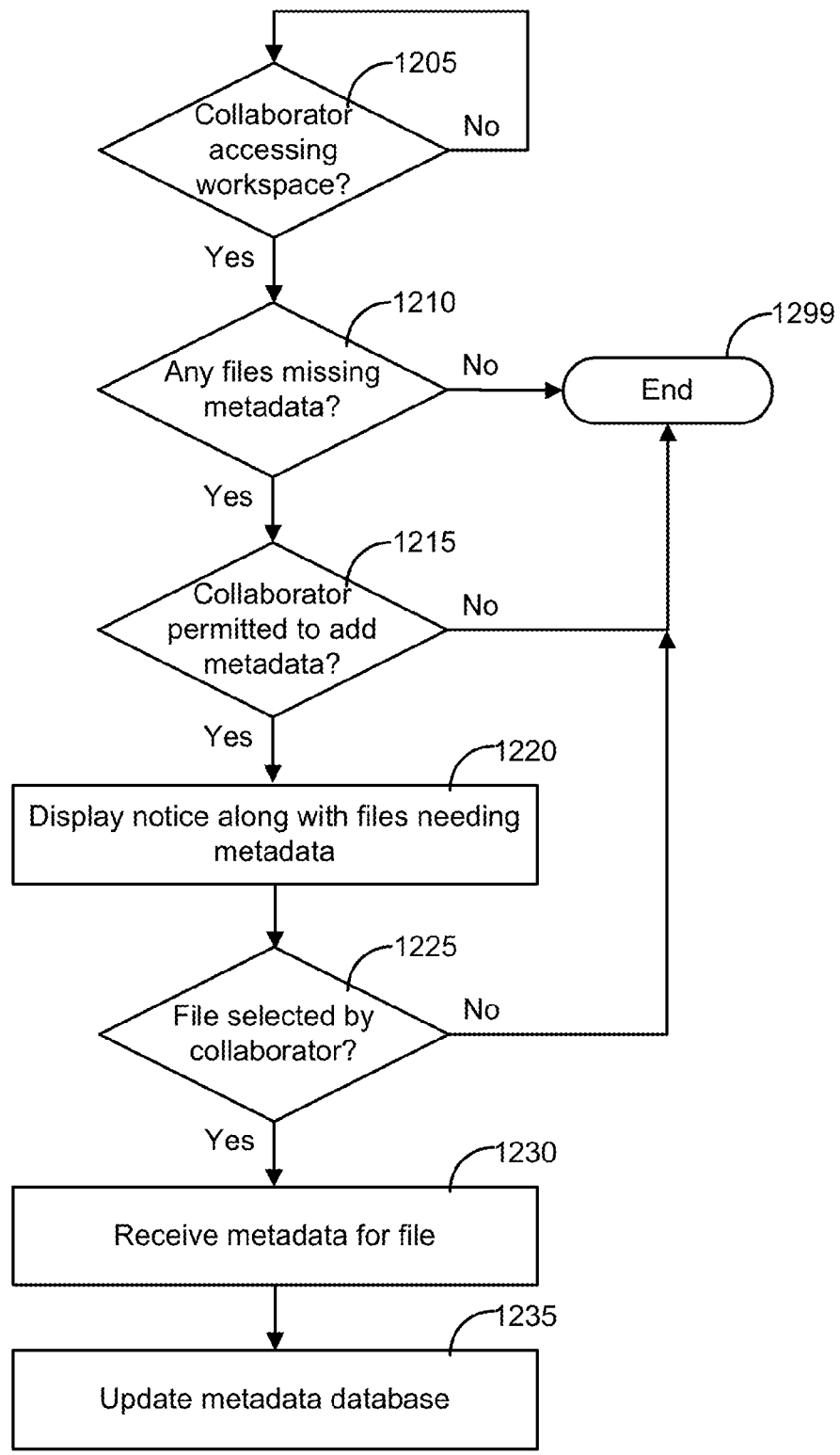
FIG. 12 depicts a flow diagram illustrating an example process of a collaborator entering a workspace.

FIG. 12 depicts a flow diagram illustrating an example process of a collaborator entering a workspace or folder in the online content management system. At decision block 1205, the system determines if a collaborator is accessing a workspace. If no collaborator is accessing a workspace (block 1205—No), the process remains at decision block 1205 until a collaborator accesses a workspace.

If a collaborator access a workspace (block 1205—Yes), at decision block 1210 the system determines if any files or work items are missing metadata for the attributes selected by the workspace creator for the work items uploaded to the workspace. If there are no files missing metadata (block 1210—No), the process ends at block 1299.

If there are files in the workspace that are missing metadata (block 1210—Yes), at decision block 1215, the system determines if the collaborator accessing the workspace is permitted to add metadata. If the collaborator is not permitted to add metadata (block 1215—No), the process ends at block 1299.

If the collaborator is permitted to add metadata (block 1215—Yes), at block 1220, the system displays a notice that metadata is needed, the files that need metadata, and the attributes for which metadata is missing for those files. In one embodiment, the system can also permit the collaborator to add metadata for optional attributes not selected by the folder creator, as long as the optional attribute has been created by the administrator.

Then at decision block 1225, the system determines if a file has been selected by the collaborator to add metadata. If the collaborator does not select a file for adding metadata (block 1225—No), the process ends at block 1299.

If the collaborator selects a file (block 1225—Yes), at block 1230 the system receives the metadata for the file. Then at block 1235, the system updates the metadata database with the new metadata.

Figure 13:
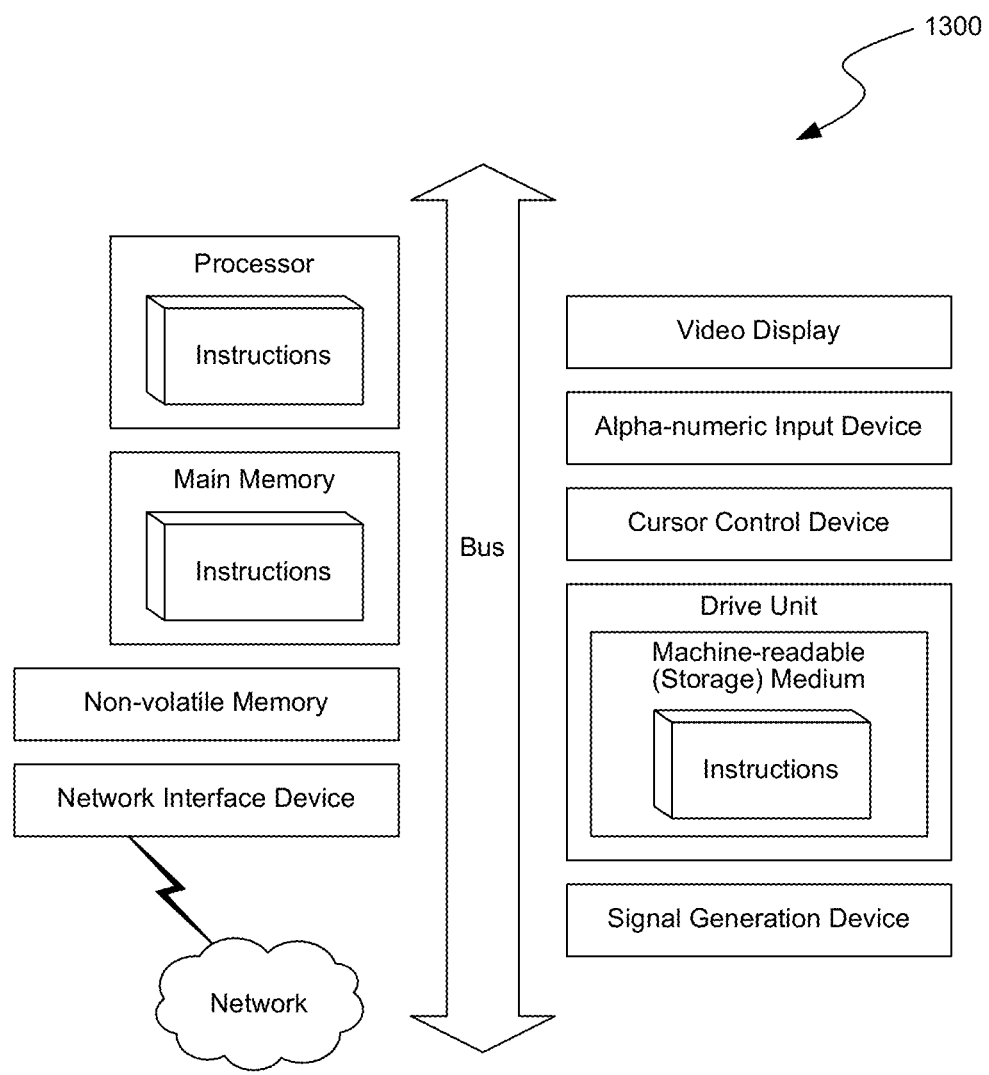
FIG. 13 shows a diagrammatic representation of a machine in the example form of a computer system within which a set of instructions, for causing the machine to perform any one or more of the methodologies discussed herein, may be executed.

FIG. 13 shows a diagrammatic representation of a machine 1300 in the example form of a computer system within which a set of instructions, for causing the machine to perform any one or more of the methodologies discussed herein, may be executed In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1300 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Conclusion

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

I claim:

1. A method of implementing metadata in a storage system, the method comprising:
   creating, by one or more processors of the storage system, a plurality of global metadata attributes to be used in one or more accounts on the storage system responsive to input from an administrator of the one or more accounts;
   creating, responsive to input from a creator user, a workspace within one of the one or more accounts in the storage system,
      wherein creating the workspace includes selecting workspace metadata attributes for the workspace from the plurality of global metadata attributes,
      wherein creating the workspace includes setting default values for one or more of the selected workspace metadata attributes,
      wherein the selected workspace metadata attributes for the workspace are stored in a memory of the storage system and automatically applied to every work item uploaded to the workspace; and
   receiving, from a collaborator of the workspace, a work item that is uploaded to the workspace without requiring the collaborator to enter metadata for the selected workspace metadata attributes for the workspace that are automatically applied to the work item.

2. The method of claim 1, further comprising:
   requesting a particular collaborators of the workspace to enter metadata for the work item when the particular collaborators accesses the workspace,
      wherein the particular collaborators of the workspace is not requested to provide metadata for the work item prior to accessing the workspace.

3. The method of claim 1, further comprising:
   tagging, responsive to input from a particular collaborator of the workspace, the work item with metadata for one or more of the global metadata attributes when the one or more of the global metadata attributes are not the selected workspace metadata attributes for the workspace.

4. The method of claim 1, wherein the administrator defines one or more attribute sets, and wherein each attribute set comprises multiple attributes of the plurality of the global metadata attributes, and further wherein creating the workspace includes selecting one or more of the attribute sets to be applied to every work item uploaded to the workspace.

5. The method of claim 1, further comprising:
   creating a folder within the workspace;
   presenting the metadata to collaborators of the workspace,
      wherein the collaborators view or edit the metadata for any one of the work items in the folder of the workspace.

6. The method of claim 1, further comprising:
   performing a search for work items in one of the one or more accounts on the storage system based on metadata associated with the work items in the one or more accounts.

7. The method of claim 1, wherein the collaborators view or edit the metadata for any one of the work items in the workspace.

8. The method of claim 1, further comprising:
   recommending metadata terms for the work item to the user.

9. A method of implementing metadata in a storage system, the method comprising:
   creating, by one or more processors of the storage system, a plurality of global metadata attributes to be used in one or more accounts of the storage system responsive to input from an administrator of the one or more accounts;
   creating, responsive to input from a creator user, a workspace within one of the one or more accounts in the storage system,
      wherein creating the workspace includes selecting workspace metadata attributes for the workspace from the plurality of global metadata attributes,
      wherein the selected workspace metadata attributes for the workspace are stored in a memory of the storage system and automatically applied to every work item uploaded to the workspace; and
   receiving, from a collaborator of the workspace, a work item that is uploaded to the workspace without requiring the collaborator to enter metadata for the selected workspace metadata attributes for the workspace that are automatically applied to the work item;
   synchronizing work items in the workspace between the storage system and a second storage system; and
   mapping the metadata for the work items stored in the storage system and the second storage system.

10. A method of implementing metadata in a storage system, the method comprising:
   creating, by one or more processors of the storage system, a plurality of global metadata attributes to be used in one or more accounts on the storage system responsive to input from an administrator of the one or more accounts;
   creating, responsive to input from, a creator user, a workspace within one of the one or more accounts in the storage system,
      wherein creating the workspace includes selecting workspace metadata attributes for the workspace from the plurality of global metadata attributes,
      wherein the selected workspace metadata attributes for the workspace are automatically applied to every work item uploaded to the workspace; and
   receiving, from a first collaborator of the workspace, a work item that is uploaded to the workspace without requiring the collaborator to enter metadata for the selected workspace metadata attributes for the workspace that are automatically applied to the work item;
   tagging, responsive to input from a second collaborator of the workspace, the work item with metadata for one or more of the global metadata attributes when the one or more of the global metadata attributes are not the selected workspace metadata attributes for the workspace.

11. A system, comprising:
   one or more processors;
   a memory system having instructions stored thereon which, when executed by the one or more processors, cause the system to:

create a plurality of global metadata attributes to be used in one or more accounts on the storage system responsive to input from an administrator of the one or more accounts;
create a workspace within one of the one or more accounts in the storage system responsive to input from a creator user,
wherein creating the workspace includes selecting workspace metadata attributes for the workspace from the plurality of global metadata attributes,
wherein creating the workspace includes setting default values for one or more of the selected workspace metadata attributes,
wherein the selected workspace metadata attributes for the workspace are automatically applied to every work item uploaded to the workspace; and
receive a work item that is uploaded to the workspace by a collaborator of the workspace without requiring the collaborator to enter metadata for the selected workspace metadata attributes for the workspace that are automatically applied to the work item.

12. The system of claim 11, wherein the instructions, when executed by the one or more processors, further cause the system to:
request that a particular collaborator of the workspace enter metadata for the work item when the particular collaborator accesses the workspace,
wherein the particular collaborator of the workspace is not requested to provide metadata for the work item prior to accessing the workspace.

13. The system of claim 11, wherein the instructions, when executed by the one or more processors, further cause the system to:
responsive to input from a particular collaborator of the workspace, tag the work item with metadata for one or more of the global metadata attributes when the one or more of the global metadata attributes are not the selected workspace metadata attributes for the workspace.

14. The system of claim 11, wherein to create the plurality of global metadata attributes, the administrator defines one or more attribute sets, wherein each attribute set comprises multiple attributes of the plurality of the global metadata attributes, and further wherein creating the workspace includes selecting one or more of the attribute sets to be applied to every work item uploaded to the workspace.

15. The system of claim 11, wherein the instructions, when executed by the one or more processors, further cause the system to:
create a folder in the workspace.

16. The system of claim 15, wherein the instructions, when executed by the one or more processors, further cause the system to:
present the metadata to collaborators of the workspace,
wherein the collaborators view or edit the metadata for any one of the work items in the folder of the workspace.

17. The system of claim 11, wherein the instructions, when executed by the one or more processors, further cause the system to:
perform a search for work items in one of the one or more accounts on the storage system based on metadata associated with the work items in the one or more accounts.

18. The system of claim 11, wherein the collaborators view or edit the metadata for any one of the work items in the workspace.

19. The system of claim 11, wherein the instructions, when executed by the one or more processors, further cause the system to:
recommend metadata terms for the work item to the user.

20. A non-transitory computer-readable storage medium having instructions stored thereon which, when executed by one or more processors of a system, cause the system to:
create a plurality of global metadata attributes to be used in one or more accounts on a storage system responsive to input from an administrator of the one or more accounts;
create a workspace within one of the one or more accounts in the storage system responsive to input from a creator user,
wherein creating the workspace includes selecting workspace metadata attributes for the workspace from the plurality of global metadata attributes,
wherein the selected workspace metadata attributes for the workspace are automatically applied to every work item uploaded to the workspace; and
receive, from a first collaborator of the workspace, a work item that is uploaded to the workspace without requiring the first collaborator to enter metadata for the selected workspace metadata attributes for the workspace that are automatically applied to the work item;
tagging, responsive to input from a second collaborator of the workspace, the work item with metadata for one or more of the global metadata attributes when the one or more of the global metadata attributes are not the selected workspace metadata attributes for the workspace.

* * * * *